(12) United States Patent
Nakata et al.

(10) Patent No.: US 7,007,938 B2
(45) Date of Patent: Mar. 7, 2006

(54) CLAMPING APPARATUS

(75) Inventors: Akio Nakata, Tokyo (JP); Masakazu Tetsuka, Tokyo (JP); Noboru Sakamoto, Tokyo (JP); Katsuhiro Ono, Tokyo (JP)

(73) Assignees: Koganei Corporation, Tokyo (JP); Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/514,869

(22) PCT Filed: May 16, 2003

(86) PCT No.: PCT/JP03/06150

§ 371 (c)(1),
(2), (4) Date: Nov. 15, 2004

(65) Prior Publication Data

US 2005/0242482 A1   Nov. 3, 2005

(30) Foreign Application Priority Data

May 16, 2002   (JP)   .............................. 2002-141413

(51) Int. Cl.
*B23Q 3/08*   (2006.01)
(52) U.S. Cl. ........................................ 269/32; 269/228
(58) Field of Classification Search .................. 269/32, 269/228, 201, 24–27, 20, 91–95
See application file for complete search history.

(56) References Cited

U.S. PATENT DOCUMENTS

| 5,647,581 | A  | * | 7/1997 | Corle .......................... 269/32 |
| 5,778,511 | A  | * | 7/1998 | Keaton ........................ 29/559 |
| 6,273,408 | B1 | * | 8/2001 | Moilanen et al. ............. 269/32 |
| 6,364,301 | B1 | * | 4/2002 | Takahashi ..................... 269/32 |

FOREIGN PATENT DOCUMENTS

JP   04283034 A   10/1992

* cited by examiner

*Primary Examiner*—Lee D. Wilson
(74) *Attorney, Agent, or Firm*—McCormick, Paulding & Huber LLP

(57) ABSTRACT

A workpiece cradle and a clamp arm is provided, and an arm opening/closing cylinder 15 for opening and closing the clamp arm and the workpiece cradle are attached to a moving block 13. To a workpiece-cradle driving cylinder 23 provided with a piston rod 25 for driving the moving block 13, fluid is supplied from workpiece-cradle driving supply/discharge ports 27a and 27b formed in a manifold block 21. To the moving block 13, guide rods 33a and 33b are fixed and, to the arm opening/closing cylinder 15, fluid is supplied, from arm driving supply/discharge ports 34a and 34b formed in the manifold block 21, via hollow holes 36a and 36b in the guide rods 33a and 33b and via fluid supply/discharge paths 43a and 43b in the moving block 13.

5 Claims, 5 Drawing Sheets

CLAMPING APPARATUS

TECHNICAL FILED OF THE INVENTION

The present invention relates to a clamping apparatus for fixing workpieces made of panel materials etc. and more specifically to a clamping apparatus effectively applicable to a car-body production line.

BACKGROUND OF THE INVENTION

When panel materials are to be joined together by spot welding, those panel materials are fixed by a clamping apparatus. For example, a car body is produced by assembling a plurality of panel materials, each of which constitutes the car body, using a joining means such as spot welding. In assembling the car body, the plurality of panel materials are positioned on a welding stage and are joined together in a state of clamping them. As a car-body assembly method, there is a method in which panel materials are transferred to a production line formed by a plurality of welding stages, on each of which a clamping apparatus is disposed, through use of carrier devices such as conveyors or transfer trucks. In this case, other panel materials are transferred to the respective welding stages by the carrier devices, and both panel materials are positioned and clamped by the clamping apparatuses fixed onto bases of the welding stages and, in such a state, are joined together by welding devices. In this method, the other panel materials are joined, to the panel materials transferred by the carrier devices such as conveyors or transfer trucks, at the welding stages, and these panel materials are transferred by the carrier devices to the next welding stages for welding further other panel materials.

Meanwhile, as another car-body assembly method, Japanese Patent Laid-Open No. 4-283034 discloses a method in which panel materials are transferred using transfer trucks to which the clamping apparatuses are provided. In this case, the panel materials become fastened by the clamping apparatuses of the transfer trucks, and while the panel materials are moved by the transfer trucks to a car-body assembly line that is equipped with the welding stages arranged per predetermined interval, assembly work is done by spot welding etc. of the other panel materials at the respective welding stages. In this method, clamping components carry out opening and closing operations at the respective welding stages, and the final stage of the car-body assembly line and the first stage thereof are connected by a return line, whereby the transfer trucks are used in circulation.

In both of the methods, as the clamping apparatuses, the clamping components intended to be opened and closed by pneumatic cylinders are employed, and pipes and hoses for supplying compressed air for opening and closing the clamping components are arranged around the clamping apparatuses. For this reason, the pipes and hoses interfere with various apparatuses and appliances in some cases, and it is necessary to ensure sufficient spaces around the clamping apparatuses so as not to interfere with the apparatuses and appliances even if the pipes and hoses swing.

Especially, in the case of carrying out a mixed flow production to simultaneously produce a plurality of types and makes of vehicles in a single car-body assembly line, since a single unit of clamping component cannot clamp the plurality of panel materials, a plurality of clamping components are attached to the clamping apparatus depending on the types etc. of vehicles to be produced and the corresponding clamping components move to predetermined clamp positions in accordance with the types etc. of vehicles to be carried. Consequently, the plurality of clamping components are attached intensively to the clamping apparatus, and pneumatic cylinders for open/close-driving the respective clamping components are attached to the clamping apparatus in accordance with the number of clamping components. Therefore, it is necessary to attach many pipes and hoses to each clamping apparatus in order to supply the compressed air to respective pneumatic cylinders, and it is required to ensure sufficient spaces around the pipes etc., in order to prevent the pipes etc. from interfering with the apparatuses and appliances even if the pipes etc. swing depending on the opening/closing operations of the clamping components.

An object of the present invention is to provide a clamping apparatus in which pipes and hoses for supplying fluid to a clamp-arm opening/closing cylinder are arranged so as not to be exposed externally.

Another object of the present invention is to provide such a clamping apparatus that sufficient spaces can be ensured around it.

Another object of the present invention is to provide a clamping apparatus intended to supply fluid via internal flow paths to a clamp-arm opening/closing cylinder and a moving-block driving cylinder provided to a plurality of moving blocks, each of which is movable.

DISCLOSURE OF THE INVENTION

The present invention is a clamping apparatus characterized by having a workpiece cradle reciprocable between a clamp position and a retreat position and a clamp arm for fastening workpieces along with the workpiece cradle, the clamping apparatus comprising: a moving block to which said workpiece cradle is attached and an arm opening/closing cylinder for opening and closing said clamp arm is attached; a manifold block arranged so as to face said moving block via a guide block and provided with a workpiece-cradle driving supply/discharge port and an arm driving supply/discharge port; a workpiece-cradle driving cylinder that is attached between said guide block and said manifold block and in which a moving piston having a piston rod fixed to said moving block is assembled and a fluid chamber communicating with said workpiece-cradle driving supply/discharge port is formed; a guide rod that is fixed to said moving block and in which a hollow hole communicating with a fluid chamber of said arm opening/closing cylinder and communicating with a fluid supply/discharge path formed in said moving block is formed; and a guide cylinder attached between said guide block and said manifold block, guiding said guide rod movably, and communicating with said arm driving supply/discharge port, wherein fluid is supplied to said arm opening/closing cylinder via said fluid supply/discharge path and said hollow hole.

The present invention is characterized in that said workpiece-cradle driving cylinder has a forward fluid chamber for driving said piston rod forward and a backward fluid chamber for driving said piston rod backward, and said workpiece-cradle driving supply/discharge port has two support/discharge ports for said forward fluid chamber and said backward fluid chamber. Also, the clamping apparatus according to the present invention is a clamping apparatus characterized in that said arm opening/closing cylinder has a fastening fluid chamber for driving said clamp arm in a fastening direction and a releasing fluid chamber for driving said clamp arm in a releasing direction, and said arm driving supply/discharge port has two support/discharge ports for said fastening fluid chamber and said releasing fluid chamber.

The present invention is a clamping apparatus characterized by a plurality of said moving blocks, each of which is provided with said workpiece cradle and is reciprocable between a clamp position and a retreat position independently from one another. Further, the present invention is a clamping apparatus characterized in that said moving block reciprocates vertically between the clamp position and the retreat position.

In the present invention, by supplying and discharging the fluid via the supply/discharge port formed in the manifold block, the fluid can be supplied to and discharged from the inside of the apparatus with respect to the workpiece-cradle driving cylinder for driving the moving block between the clamp position and the retreat position and to the arm opening/closing cylinder for opening and closing the clamp arm, so that it is unnecessary to arrange pipes and hoses for supplying and discharging the fluid around the apparatus. Therefore, it is possible to arrange other appliances around the apparatus without ensuring wide spaces between them and the clamping apparatus. The workpiece-cradle driving cylinder may be of a double-acting type or single-acting type. Similarly, the arm opening/closing cylinder may be of a double-acting type or single-acting type. Further, the reciprocation of the workpiece cradle between the clamp position and the retreat position may be made in a vertical direction or a horizontal and inclined direction.

BEST MODE FOR CARRYING OUT THE INVENTION

Figure 1:
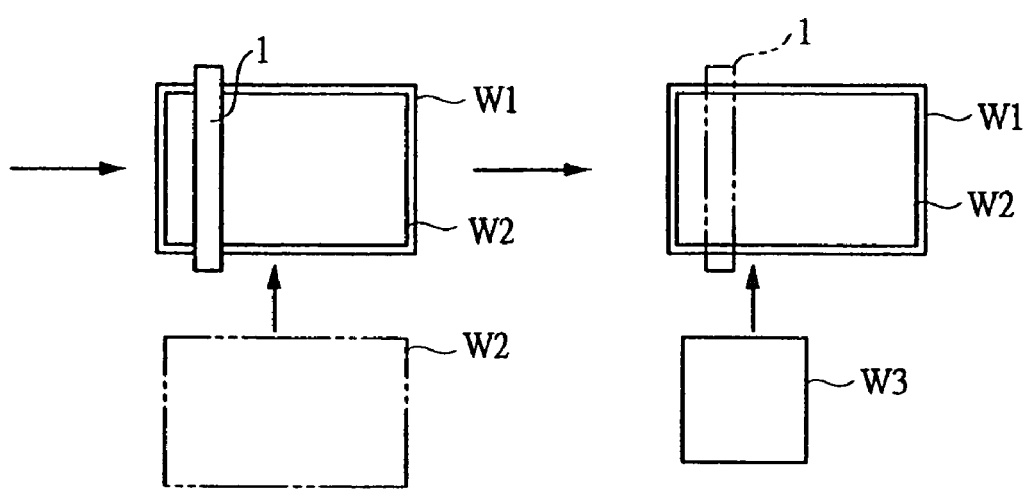
FIG. 1 is a schematic diagram showing an example of a car-body assembly line for joining a plurality of panel materials and producing car bodies.

Hereinafter, an embodiment of the present invention will be detailed based on the drawings. FIG. 1 is a schematic diagram showing an example of a car-body assembly line for joining a plurality of panel materials and producing car bodies. In FIG. 1, two units among a plurality of welding stages are shown. To a panel material W1 that is transferred to a welding stage by a carrier device such as a conveyor or a transfer truck, other panel material W2 is transferred, and both of the panel materials W1 and W2 are fastened and positioned and fixed by a clamping apparatus 1 that is fixed onto the welding stage. In a state in which they are positioned and fixed, both the panel materials W1 and W2 are joined together by a spot welding device not illustrated. After completion of welding work, both the panel materials W1 and W2 are transferred by the carrier device to the next welding stage and, in a state in which they are fastened by the clamping apparatus 1, further other panel material W3 is welded onto them.

Figure 3:
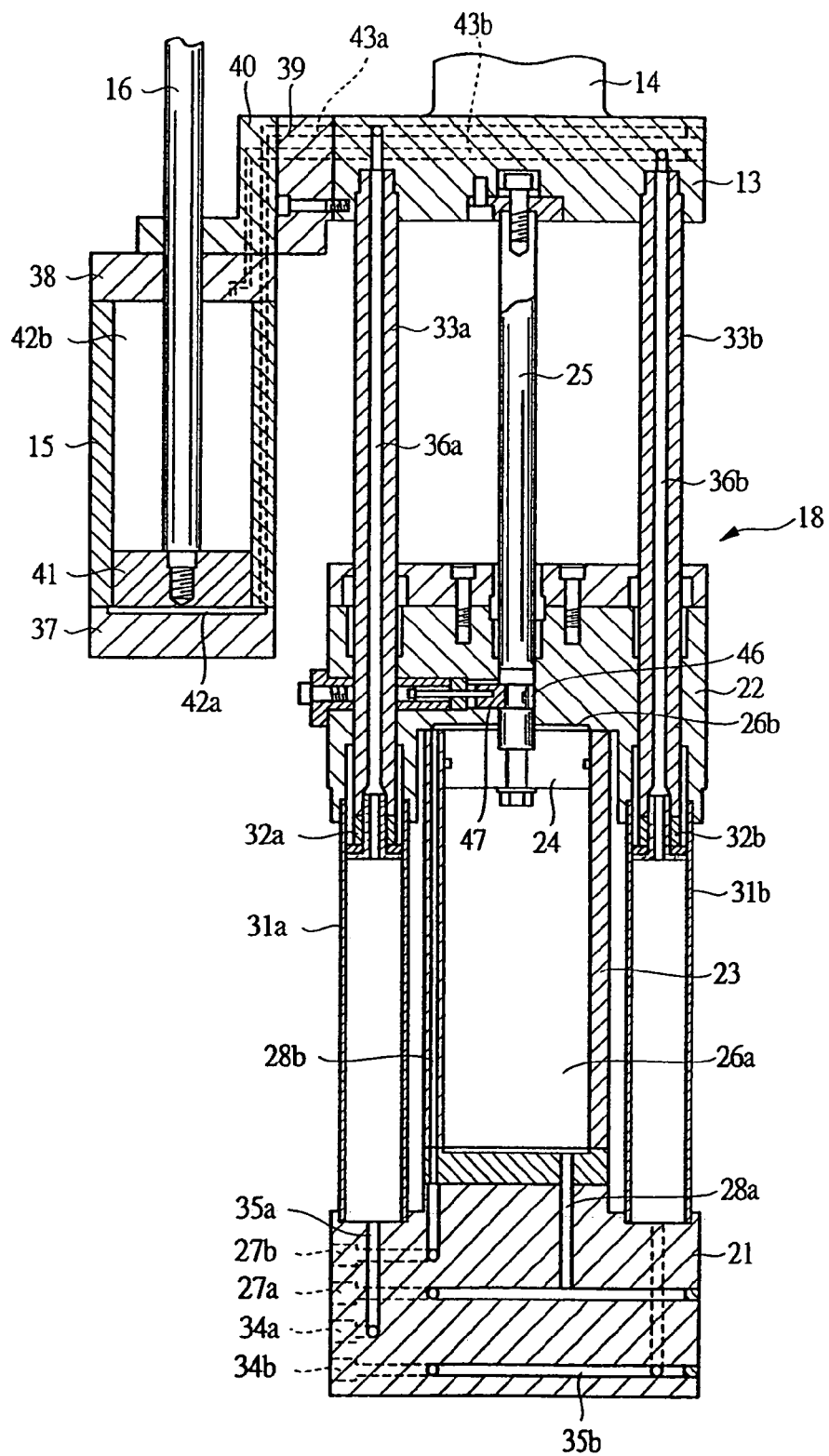
FIG. 3 is a front and sectional side view showing an enlarged portion of FIG. 2A.
Figure 4:
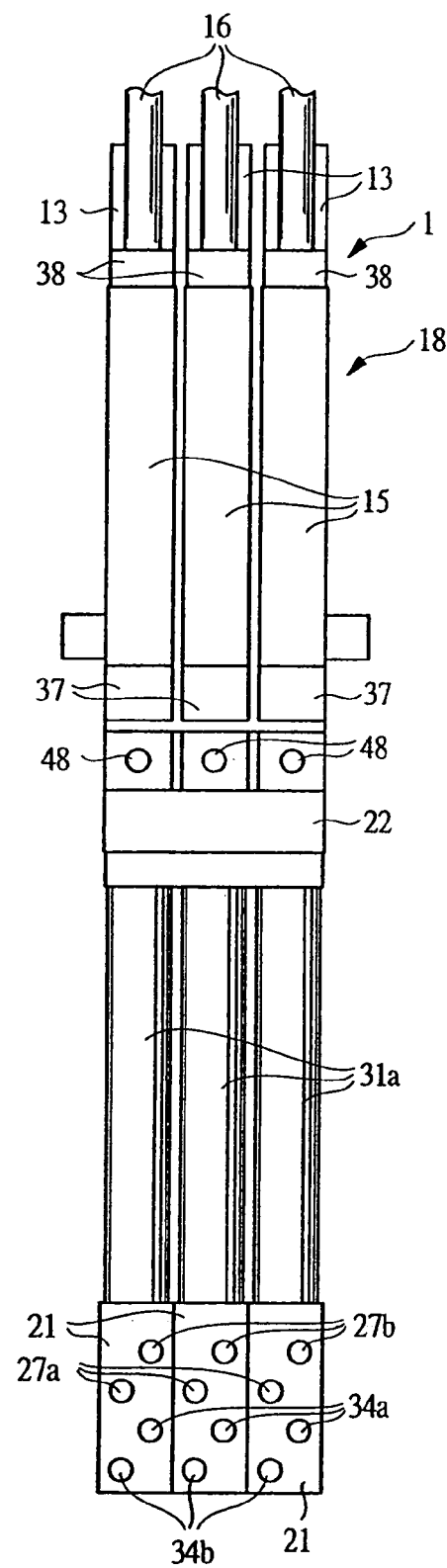
FIG. 4 is a left side view of FIG. 3.
Figure 5:
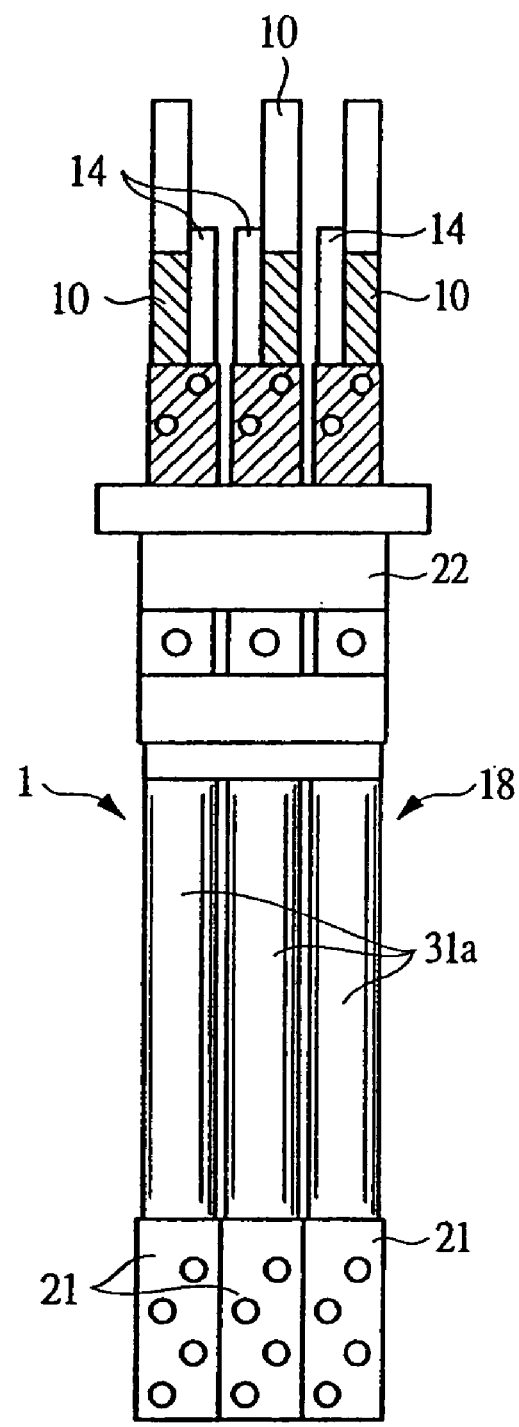
FIG. 5 is a diagram viewed from a direction taken along the line A—A in FIG. 2C.

FIGS. 2A through 2C are front views showing a clamping apparatus that is provided to the welding stage; FIG. 3 is a front and sectional side view showing an enlarged portion of FIG. 2A; FIG. 4 is a left side view of FIG. 3; and FIG. 5 is a diagram viewed from a direction taken along the line A—A in FIG. 2C.

Figure 2:
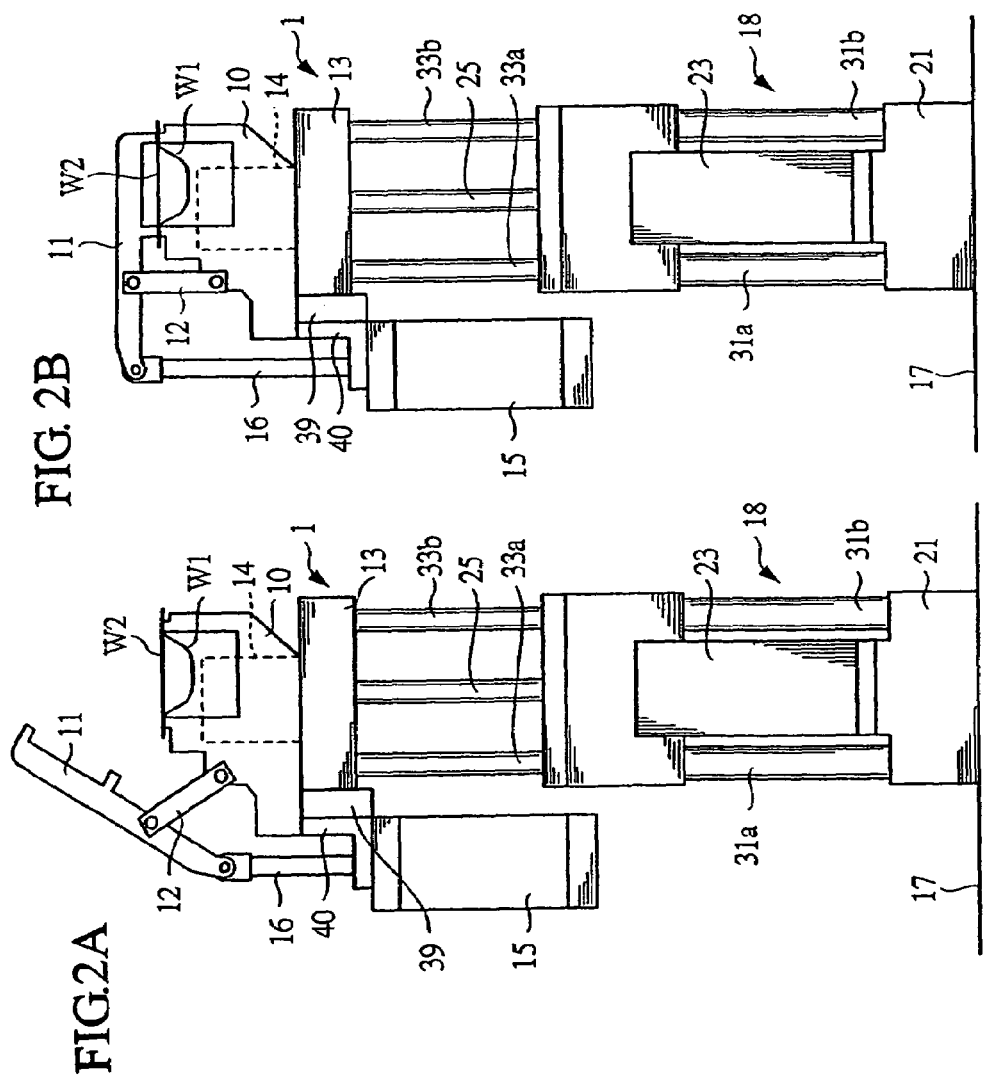
FIG. 2A is a front view showing a clamping apparatus in a state in which a workpiece cradle arrives at its clamp position and a clamp arm arrives at its released position.
FIG. 2B is a front view showing a clamping apparatus in a state in which a clamp arm arrives at its fastening position.
FIG. 2C is a front view showing a clamping apparatus in a state in which a workpiece cradle arrives at its retreat position.

As shown in FIG. 2, the clamping apparatus 1 for positioning and clamping, as workpieces, the two panel materials W1 and W2 that constitute a car body includes: a workpiece cradle 10; and a clamp arm 11 for fastening the panel materials W1 and W2 as workpieces together with the workpiece cradle 10. The clamp arm 11 is pin-connected swingably to the workpiece cradle 10 via a link 12. The workpiece cradle 10 is attached to a bracket 14 fixed onto a moving block 13. A piston rod 16 of an arm opening/closing cylinder 15 attached to the moving block 13 is pin-connected to the clamp arm 11 and, as shown in FIG. 2A, when the piston rod 16 moves backward, the clamp arm 11 arrives at its released position where the workpieces are away from the workpiece cradle 10. On the contrary, as shown in FIG. 2B, when the piston rod 16 moves forward, the clamp arm 11 arrives at its fastening position where it and the workpiece cradle 10 fasten the workpieces.

On a base 17 of a welding stage, a cylinder assembly body 18 is installed. By this cylinder assembly body 18, the workpiece cradle 10 reciprocates vertically between a clamp position which is the upper limit position as shown in FIGS. 2A and 2B and a retreat position which is the lower limit position as shown in FIG. 2C.

The cylinder assembly body 18 has, as shown in FIG. 3, a manifold block 21 and a guide block 22 located above the manifold block, and the manifold block 21 is located so as to face the moving block 13 via the guide block 22. Between the guide block 22 and the manifold block 21, a workpiece-cradle driving cylinder 23 is attached. Into this cylinder 23, a moving piston 24 is assembled so as to be reciprocable in directions of forward motion, i.e., upward motion, and backward motion, i.e., downward motion. To this moving piston 24, the other end of a piston rod 25 whose one end is fixed to the moving block 13 is fixed.

The inside of the cylinder 23 is partitioned by the moving piston 24 into a fluid chamber 26a for forward motion and a fluid chamber 26b for backward motion. If compressed air is supplied into the fluid chamber 26a, the piston rod 25 moves forward and the workpiece cradle 10 arrives at the clamp position that is the forward limit position. If the compressed air in the fluid chamber 26a is discharged and the compressed air is supplied to the fluid chamber 26b, the workpiece cradle 10 returns to the retreat position that is the backward limit position. In the manifold block 21, two supply/discharge ports 27a and 27b for driving the workpiece cradle are formed. The supply/discharge port 27a communicates with the fluid chamber 26a via a fluid supply/discharge path 28a formed in the manifold block 21, and the supply/discharge port 27b communicates with the fluid chamber 26b via a fluid supply/discharge path 28b formed in the manifold block 21 and the cylinder 23.

Between the guide block 22 and the manifold block 21, two guide cylinders 31a and 31b are attached to both sides of the workpiece-cradle driving cylinder 23. Into the respective guide cylinders 31a and 31b, guide pistons 32a and 32b are assembled so as to be reciprocable in directions of forward motion, i.e., upward motion and backward motion, i.e., downward motion. To the respective guide pistons 32a and 32b, other ends of guide rods 32a and 32b whose respective one ends are fixed to the moving block 13 are fixed. Thereby, when the moving block 13 is moved upward and downward between the clamp position and the retreat position by the workpiece-cradle driving cylinder 23, the moving block 13 is guided by the two guide rods 33a and 33b.

In the manifold block 21, two supply/discharge ports 34a and 34b for driving the arm are formed. The supply/discharge port 34a communicates with the inside of one guide cylinder 31a via a fluid supply/discharge path 35a formed in the manifold block 21, and the supply/discharge port 34b communicates with the inside of the other guide cylinder 31b via a fluid supply/discharge path 35b formed in the manifold block 21. In the guide pistons 32a and 32b and the guide rods 33a and 33b, hollow holes 36a and 36b are formed, respectively, wherein the hollow holes 36a and 36b communicate with the supply/discharge ports 34a and 34b, respectively.

To one end of the arm opening/closing cylinder 15, a head cover 37 is attached and, to the other end thereof, a rod cover 38 through which the piston rod 16 passes is attached. These are assembled therein and concurrently communicate with the moving block 13 by a linking block 39 and a bracket 40. To the piston rod 16, a piston 41 reciprocating in the arm opening/closing cylinder 15 is fixed and, by this piston 41, the inside of the cylinder 15 is partitioned into a fluid chamber 42a for forward motion and a fluid chamber 42b for backward motion.

In order to communicate with the fluid chamber 42a for forward motion and the hollow hole 36a, as shown in FIG. 3, a fluid supply/discharge path 43a is formed in the moving block 13, the linking block 39, the bracket 40, and the cylinder 15. Further, in order to communicate with the fluid chamber 42b for backward motion and the hollow hole 36b, a fluid supply/discharge path 43b is formed in the moving block 13, the linking block 39, the bracket 40, and the rod cover 38. To mutual contact surfaces among components of the linking block 39 etc. forming the respective fluid supply/discharge paths 43a and 43b, sealing members such as gaskets or the likes are provided, whereby linkage of air is prevented.

Accordingly, as shown in FIG. 3, in a state in which the compressed air is supplied from the supply/discharge port 27a and the moving block 13 is moved upward to the forward limit position and the workpiece cradle 10 arrives at the clamp position, if the compressed air is supplied from the supply/discharge port 34b, the compressed air is supplied to the fluid chamber 42b for backward motion and, as shown in FIG. 2A, the piston rod 16 arrives at the backward limit position and the clamp arm 11 arrives at the released position. On the contrary, if the compressed air is supplied from the supply/discharge port 34a and air is discharged from the supply/discharge port 34b, the compressed air is supplied to the fluid chamber 42a for forward motion and, as shown in FIG. 2B, the piston rod 16 arrives at the forward limit position and the clamp arm 11 arrives at the fastening position.

Thus, the compressed air can be supplied to and/or discharged from the fluid chambers 42a and 42b of the arm opening/closing cylinder 15 via the fluid supply/discharge paths 43a and 43b formed in the moving block 13. Therefore, it is unnecessary to arrange air-supplying pipes and hoses around the arm opening/closing cylinder 15. For this reason, it becomes possible to arrange closely both of appliances such as welding devices to be arranged around the clamping apparatus 1 and the arm opening/closing cylinder 15, whereby the clamping apparatus 1 can be located in the limited space. Further, it is possible to carry out control for moving the workpiece cradle 10 upward and downward between the clamp position and the retreat position and for opening/closing the clamp arm 11 between the fastening position and the released position, by the supply and discharge of the compressed air from the four supply/discharge ports provided intensively in the manifold block 21. Accordingly, simply by connecting hoses and/or pipes to the four supply/discharge ports 27a, 27b, 34a, and 34b, it is possible to supply and discharge the compressed air to and from the two cylinders 15 and 23, in the inside of the clamping apparatus 1.

In order to lock the piston rod 25 in a state in which the workpiece cradle 10 arrives at the clamp position that is the upward limit position, as shown in FIG. 3, a stopper 47 that is engaged with an annular groove 46 formed in the piston rod 25 is attached movably to the guide block 22. To this stopper 47, a spring force is applied in such a direction as to be engaged with the annular groove 46, and a pneumatic cylinder is assembled to release the engagement against the spring force. Accordingly, in the state in which the piston rod 25 arrives at the forward limit position as shown in FIG. 3, when the moving block 31 moves forward to a position of being engaged with the annular groove 46, the moving block 13 is locked at the forward limit position. The release of the locking is automatically made by supplying the compressed air to the pneumatic cylinder. Note that the release of the locking may be operated manually.

In the illustrated clamping apparatus, the upward motion of the piston rod 25 to the forward limit position and the downward motion thereof to the backward limit position are carried out respectively by compressed air. However, the movement to the forward limit may be made by the compressed air and the backward movement may be made by the weight itself of the moving block 13 or the like.

As shown in FIG. 4, one clamping apparatus 1 is constituted by a combination of three units of the cylinder assembly 18, each of which makes the moving blocks 13 reciprocate. To the respective moving blocks 13, the workpiece cradles 10 for supporting workpieces, i.e., panel materials of mutually different shapes are attached. Accordingly, by moving upward the moving block 13 corresponding to one of the workpiece cradles 10 according to the kinds of the panel materials to which welding work is to be carried out and setting the workpiece cradle 10 to the clamp position, it is possible to position and clamp three kinds of workpieces by use of a single unit of the clamping apparatus 1. In the illustrated clamping apparatus 1, one guide block 22 is provided with respect to three units of the cylinder assembly 18. However, with regard to the guide block 22 too, three units of the guide block 22 may be used individually.

In order to obtain a sufficient thrust even when the thickness dimensions in a lateral direction are made short, the arm opening/closing cylinder 15 and the workpiece-cradle driving cylinder 23 are made into cylinders of thin walls whose width dimensions in FIG. 2 are larger than the thickness dimensions. However, the number of the cylinder assemblies 18 to be provided to one unit of the clamping apparatus 1 is not limited to three, and it may be set to the arbitrary number according to the kinds of workpieces to be assembled. Further, by changing the thickness dimensions of the respective manifold blocks 21, it is possible to adjust a center interval between the adjacent cylinders 15 and a center interval between the adjacent cylinders 23.

In the case of effecting the car-body assembly production by use of such a clamping apparatus 1, one of three moving blocks 13 corresponding to the kinds of panel materials to be assembled is driven from the lower limit position, i.e., the retreat position shown in FIG. 2A to the upper limit position, i.e., the clamp position shown in FIG. 2B. In carrying out the upward movement of the moving block 13, the compressed air is supplied from the supply/discharge port 27a of the corresponding cylinder assembly body 18. When the moving block reaches the upper limit position, the stopper 47 is engaged with the annular groove 46 to lock the moving block 13.

When the moving block 13 thus reaches the upper limit position, the workpiece cradle 10 arrives at the clamp position. In this state, if the supply and discharge of the compressed air from the supply/discharge ports 34a and 34b is controlled, the clamp arm 11 opens and closes between the released position shown in FIG. 2A and the fastening position shown in FIG. 2B, thereby allowing the panel materials W1 and W2 as workpieces to be clamped.

The present invention is not limited to the above-mentioned embodiment and can be variously altered and modified without departing from the gist thereof. For example, the arm opening/closing cylinder 15 and the workpiece-cradle driving cylinder 23 are respectively pneumatic cylinders, but may be hydraulic cylinders that are driven by liquid pressure such as oil pressure. Also, the clamping apparatus makes the workpiece cradle 10 reciprocate vertically between the clamp position and the retreat position, but may make it reciprocate in a horizontal or inclined direction.

According to the present invention, since the fluid can be supplied to and discharged from the inside of the apparatus with regard to the workpiece-cradle driving cylinder and the arm opening/closing cylinder, it is unnecessary to arrange pipes and hoses for supplying and discharging the fluid around the apparatus. Therefore, other appliances can be arranged around the apparatus without ensuring the wide spaces between the appliances and the clamping apparatus, whereby it becomes possible to make the most of the spaces around the clamping apparatus. Further, this clamping apparatus is attached onto the base of the welding stage configuring the car-body assembly line, but may be attached to a carrier device that moves along the car-body assembly line. Furthermore, the clamping apparatus according to the present invention can be used not only in car body assembly but also can use any workpieces in the case of positioning and clamping workpieces, i.e., materials to be processed.

INDUSTRIAL APPLICABILITY

The clamping apparatus according to the present invention can be used in a car-body production line for welding panel materials and assembling car bodies.

What is claimed is:

1. A clamping apparatus having a workpiece cradle reciprocable between a clamp position and a retreat position and a clamp arm for fastening workpieces along with the workpiece cradle, the clamping apparatus comprising:

a moving block to which said workpiece cradle is attached and an arm opening/closing cylinder for opening and closing said clamp arm is attached;

a manifold block arranged so as to face said moving block via a guide block and provided with a workpiece-cradle driving supply/discharge port and an arm driving supply/discharge port;

a workpiece-cradle driving cylinder that is attached between said guide block and said manifold block and in which a moving piston having a piston rod fixed to said moving block is assembled and a fluid chamber communicating with said workpiece-cradle driving supply/discharge port is formed;

a guide rod that is fixed to said moving block and in which a hollow hole communicating with a fluid chamber of said arm opening/closing cylinder and communicating with a fluid supply/discharge path formed in said moving block is formed; and a guide cylinder attached between said guide block and said manifold block, guiding said guide rod movably, and communicating with said arm driving supply/discharge port, wherein fluid is supplied to said arm opening/closing cylinder via said fluid supply/discharge path and said hollow hole.

2. The clamping apparatus according to claim 1, wherein said workpiece-cradle driving cylinder has a forward fluid chamber for driving said piston rod forward and a backward fluid chamber for driving said piston rod backward, and said workpiece-cradle driving supply/discharge port has two support/discharge ports for said forward fluid chamber and said backward fluid chamber.

3. The clamping apparatus according to claim 1, wherein said arm opening/closing cylinder has a fastening fluid chamber for driving said clamp arm in a fastening direction and a releasing fluid chamber for driving said clamp arm in a releasing direction, and said arm driving supply/discharge port has two support/discharge ports for said fastening fluid chamber and said releasing fluid chamber.

4. The clamping apparatus according to claim 1, further comprising a plurality of said moving blocks, each of which is provided with said workpiece cradle and is reciprocable between a clamp position and a retreat position independently from one another.

5. The clamping apparatus according to claim 1, wherein said moving block reciprocates vertically between the clamp position and the retreat position.

* * * * *